United States Patent [19]
Goldberg

[11] 3,913,067
[45] Oct. 14, 1975

[54] CHECK DIGIT VERIFICATION GENERATION APPARATUS

[76] Inventor: Leslie Louis Goldberg, 55, Portland Place, London, England

[22] Filed: June 14, 1973

[21] Appl. No.: 370,143

[30] Foreign Application Priority Data
June 14, 1972 United Kingdom............... 27806/72

[52] U.S. Cl. ........................................ 340/146.1 AJ
[51] Int. Cl.² ............... H03K 13/34; G06F 11/10; G06K 5/02; H04L 1/10
[58] Field of Search ........................... 340/146.1 AJ

[56] References Cited
UNITED STATES PATENTS
3,384,902  5/1968  Schröder .................... 340/146.1 AJ
3,544,776  12/1970  Fischer ...................... 340/146.1 AJ Primary Examiner—R. Stephen Dildine, Jr.
Attorney, Agent, or Firm—Brisebois & Kruger

[57] ABSTRACT
The specification discloses a check digit verification apparatus having the following novel concepts 1. the use of a read-only store (16) to hold tables of remainder values whereby to obviate the need for multiplication computing ability;
2. the use of remainder values appropriate to the respective digits of an identity number to be verified, and summation of those remainder values to provide an overall remainder value for the identity number;
3. the use of a remainder value accumulating store (23) having a number of stages equal to the modulus of the system, so that the contents of the store is an accumulated remainder value, thus obviating the need for a 'division' computing ability; and
4. the use of a register (55) for temporarily storing the digits of an identity number which is to be verified, and for retaining a predetermined initial group of digits after all the digits of the identity number have been transferred into the verification means, whereby to reduce the number of digits that have to be keyed-in when the next identity number for verification includes the retained initial group of digits.

21 Claims, 4 Drawing Figures

| DIGIT POSITION | DIGIT VALUE | | | | | | | | | |
|---|---|---|---|---|---|---|---|---|---|---|
| | 0 | 1 | 2 | 3 | 4 | 5 | 6 | 7 | 8 | 9 |
| 1ST. - (X 1) | 0 | 1 | 2 | 3 | 4 | 5 | 6 | 7 | 8 | 9 |
| 2ND. - (X 2) | 0 | 2 | 4 | 6 | 8 | 10 | 1 | 3 | 5 | 7 |
| 3RD. - (X 3) | 0 | 3 | 6 | 9 | 1 | 4 | 7 | 10 | 2 | 5 |
| 4TH. - (X 4) | 0 | 4 | 8 | 1 | 5 | 9 | 2 | 6 | 10 | 3 |
| 5TH. - (X 5) | 0 | 5 | 10 | 4 | 9 | 3 | 8 | 2 | 7 | 1 |
| 6TH. - (X 6) | 0 | 6 | 1 | 7 | 2 | 8 | 3 | 9 | 4 | 10 |
| 7TH. - (X 7) | 0 | 7 | 3 | 10 | 6 | 2 | 9 | 5 | 1 | 8 |
| 8TH. - (TRUE) | 11 | 10 | 9 | 8 | 7 | 6 | 5 | 4 | 3 | 2 |
| 8TH. - (COMPLT.) | 0 | 1 | 2 | 3 | 4 | 5 | 6 | 7 | 8 | 9 |

| DIGIT POSITION | DIGIT VALUE | | | | | | | | | |
|---|---|---|---|---|---|---|---|---|---|---|
| | 0 | 1 | 2 | 3 | 4 | 5 | 6 | 7 | 8 | 9 |
| 1st - (x 34) | 0 | 34 | 68 | 05 | 39 | 73 | 10 | 44 | 78 | 15 |
| 2nd - (x 81) | 0 | 81 | 65 | 49 | 33 | 17 | 1 | 82 | 66 | 50 |
| 3rd - (x 76) | 0 | 76 | 55 | 34 | 13 | 89 | 68 | 47 | 26 | 05 |
| 4th - (x 27) | 0 | 27 | 54 | 81 | 11 | 38 | 65 | 92 | 22 | 49 |
| 5th - (x 90) | 0 | 90 | 83 | 76 | 69 | 62 | 55 | 48 | 41 | 34 |
| 6th - (x 9) | 0 | 09 | 18 | 27 | 36 | 45 | 54 | 63 | 72 | 81 |
| 7th - (x 30) | 0 | 30 | 60 | 90 | 23 | 53 | 83 | 16 | 46 | 76 |
| 8th - (x 3) | 0 | 03 | 06 | 09 | 12 | 15 | 18 | 21 | 24 | 27 |
| 9th - (x 10) | 0 | 10 | 20 | 30 | 40 | 50 | 60 | 70 | 80 | 90 |
| 10th - (x 1) | 0 | 01 | 02 | 03 | 04 | 05 | 06 | 07 | 08 | 09 |
| 11th - (TRUE) | 90 | 80 | 70 | 60 | 50 | 40 | 30 | 20 | 10 | 00 |
| 12th - (TRUE) | 07 | 06 | 05 | 04 | 03 | 02 | 01 | 00 | 96 | 95 |

FIG. 4

CHECK DIGIT VERIFICATION GENERATION APPARATUS

This invention relates to keyboard apparatus for generating check digits for use with sequences of decimal digits, and/or for verifying decimal digit sequences which include check digits. Such apparatus may be used, for example, in checking the digit values and digit order in an identity or reference number, such as a customer's account number.

The need to verify such digit values and digit order arises, for example, when in completing a transaction (for example, in a department store) the cost of an article to be purchased is to be debited to the customer's account at the store. Verication can avoid wrong accounting, and can ensure on the spot, and at the time of recording the transaction, that the correct account number has been given by the customer and has been correctly registered by the sales assistant or clerk in the accounting and/or sales analysis system in respect of the article to be purchased.

One verification system known as the "check digit verification system" involves the addition of at least one final 'check digit' to a selected account number which is to be allotted to the customer, which check digit (or digits) is determined by a pre-determined scheme of manipulation of the digits of the selected account number, such that when the account number accompanied by the check digit (or digits) is subsequently presented by a customer to a machine or person knowing that scheme of manipulation, that machine or person can carry out, on the spot, a similar manipulation to produce a check number for comparison with the check digit (or digits) given at the end of the account number. If equality is obtained, the account number and check digit (or digits) have been properly presented and can be used in accounting an associated transaction. Thus the use of the check digit(s) or number has allowed the account identity number as presented to the verification apparatus to be verified before the associated transaction is entered.

On the other hand, if equality is not produced, a machine or person will know that the account number as presented is incorrect, and immediate enquiry can be made of the sales assistant and customer with a view to ascertaining and registering the proper account number.

The combined account number and check digit are in fact given by the department store to a customer as his "account identity number".

Various schemes of digit manipulation are known. One so-called "modulus eleven" scheme involves for example multiplying successive digits in the account number by the respective multipliers in an ascending system of multipliers (e.g. 1,2,3, etc.) to produce a series of products which are then added together to provide a sum. The sum is then divided by the modulus eleven and the remainder is used as the check digit.

Verification by means of such a check digit has hitherto involved multiplying the respective digits of the account number by the respective multipliers, adding the products, dividing the sum by the modulus and comparing the result with the check digit. Normally such verification has been carried out by expensive digital computing apparatus. The present invention seeks to avoid the need for such expensive computing apparatus.

Other systems of multipliers and/or modulii may be used according to the desire of the organisation using the verification system.

According to the present invention a keyboard apparatus for generating check digits for use with sequences of decimal digits, includes a. a plurality of manually-operable keys of which at least 10 (referred to hereafter as decimal digit keys) represent the ten respective decimal digits, b. a plurality of electric switching means associated with the respective decimal digit keys and operative to change from a first to a second switching state on operation of the associated decimal digit key, c. electric encoding means having input circuit means connected with the respective switching means, and output circuit means at which are delivered electric "digit value" signals representative of the particular electric switching means then in said second switching state, d. electric indexing means having input circuit means connected with each of said electric switching means and being responsive to the changing of any one of said switching means to said second switching state, and electric output circuit means at which are delivered electric "digit position" signals representative of the position in a sequence of decimal digits being keyed in, by sequential operation of the appropriate decimal digit keys, of the decimal digit last keyed in, e. "remainder value" signal producing means having first input circuit means connected to receive signals from said output circuit means of said encoding means, second input circuit means connected to receive signals from said output circuit means of said indexing means, and output circuit means at which is delivered in response to corresponding digit value and digit position signals delivered to said first and second input circuit means an electric "remainder value" signal representative of a predetermined remainer value corresponding to the digit value and digit position of a decimal digit just keyed in by operation of a selected decimal digit key, f. an electric "accumulated remainder value" signal storage means having an input circuit means, first and second output circuit means, and a reset circuit means connected to receive 'reset' signals from said output circuit means of said indexing means, g. an electric adding means having a first input circuit means connected to receive signals from said output circuit means of said signal producing means, a second input circuit means connected to receive signals from said first output circuit means of said signal storage means, and an output circuit means connected to deliver "sum" signals to said input circuit means of said signal storage means, which "sum38 signals represent the sum of the signals received at said first and second input circuit means, and h. an output device connected to receive signals from said second output circuit means of said signal storage means, and having output circuit means at which are delivered, after the sequence of decimal digits has been keyed in, check digit signals representative of the deviation of the signal then stored in said signal storage means from the nearest multiple of a predetermined modulus number, each said predetermined reminder value being the excess, over the nearest multiple of the modulus number, of the associated decimal digit value when multipled by a predetermined multiplier dependent on the position in said sequence of the particular decimal digit.

According to a second aspect of the present invention such a keyboard apparatus may be used for verifying decimal digit sequences which include check digits, in which case the output device has alternatively an output circuit means at which are delivered, after the sequence of decimal digits has been keyed in, two-state electric 'verification' signals of which the respective states are indicative of the correspondence, and lack of correspondence respectively between the signal then stored in said signal storage means and said nearest multiple of the predetermined modulus number, and said signal producing means delivers at its output circuit means in respect of a check decimal digit appearing in a check digit position in each said sequence a "remainder value" signal representative of a decimal value which will for correct keying-in of the digit sequence produce a state of correspondence between said then-stored signal and said nearest multiple of the predetermined modulus number.

According to another feature of the present invention such keyboard apparatus may include electrically-controlled inhibiting means for inhibiting other actions of the keyboard apparatus which are to be performed subsequently to the correct keying-in of a said sequence of decimal digits on the decimal digit keys, and means for supplying said verification signals to said inhibiting means whereby to inhibit said other actions whenever the state of a verification signal is indicative of said lack of correspondence between said then-stored signal and said nearest multiple of the modulus number; said inhibiting means may include warning means for warning an operator of the keyboard apparatus whenever a subsequent action is inhibited due to an incorrect keying-in of a said decimal digit sequence.

Preferably, said signal storage means has a signal storage capacity equal to said predetermined modulus number, so that only the excess of a said "sum" signal over the predetermined modulus number is stored in said signal storage means.

According to a further aspect of the present invention said keyboard apparatus may include an auxiliary storage means connected between said output circuit means of said encoding means and said input circuit means of said signal producing means so as to receive from said encoding means and in succession the respective digit value signals in a said digit sequence, and to store them temporarily until all of the decimal digits in such sequence have been keyed in on said decimal digit keys, control signal producing means operable on completion of the keying-in of a said sequence of decimal digits and effective to produce a "sequence complete" control signal, control means associated with said auxiliary storage means, said control signal producing means and said indexing means, and operative in response to a said "sequence complete" signal to enable said auxiliary storage means to deliver the respective stored 'digit-value' signals in succession to said signal producing means, and corresponding digit-position signals to said indexing means, said control means also enabling said auxiliary storage means to retain, for future use when handling a next sequence of digit value signals, replicas of at least a predetermined initial group of the digit value signals just delivered to said signal producing means, said indexing means having its input circuit means disconnected from said electric switching means.

According to a further feature of the present invention said auxiliary storage means comprises a shift register having a number of register stages equal to the number of decimal digits in a said sequence, and input circuit means connected with an 'input' register stage and output circuit means connected with an 'output' register stage, said control means is operative in response to a "sequence-complete" control signal to deliver to said shift register a sequence of shift pulses whereby to cause said shift register to deliver in succession via its output circuit means to said signal producing means 'digit value' signals then stored in the successive register stages, the shift pulses also being delivered to said indexing means as said corresponding 'digit position' signals, and said control means includes unidirectional feedback circuit means interconnecting said input and output circuit means of said shift register for feeding back to said input register stage digit value signals delivered by said shift register via said register output circuit means to said signal producing means, and means for preventing any change in said predetermined initial group of digit value signals fed back to and stored in a corresponding group of register stages adjacent said register output circuit means until on keying in a subsequent sequence of decimal digits a different initial group of digit value signals is required to be stored in that group of register stages.

Said control means preferably includes resetting means responsive to said shift pulses and effective when said digit value signal sequence is being fed back to said register input circuit means to reset to 'zero' state all of the register stages lying between said register input circuit means and said corresponding group of register stages.

Preferably, said "remainder value" signal producing means comprises an electric storage means for holding at separate storage addresses predetermined "remainder value" signals for each of the respective digit values that may appear in the respective digit positions in a said sequence, and said storage addresses deliver to said output circuit means of said signal producing means said "remainder value" signals when addressed by corresponding "digit value" and "digit position" signals delivered to said first and second input circuit means of said signal producing means. Advantageously, said electric storage means comprises a read-only storage means.

Other features and aspects of the present invention will appear from the description and claims that follow.

One check digit verification/generation apparatus, and a modified form thereof, according to the present invention will now be described by way of example and with reference to the accompanying drawings in which:

FIG. 4 shows a table, generally similar to that of FIG. 2, for use in the modified apparatus shown in FIG. 3.

Figures 1, 2:
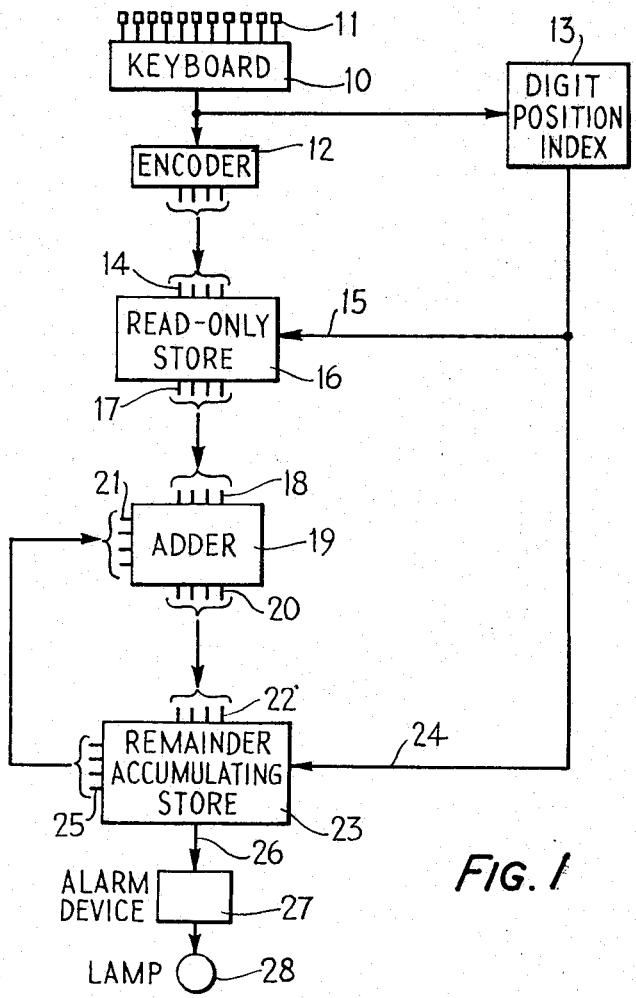
FIG. 1 shows a schematic block diagram of the electric circuit connections of the apparatus.
FIG. 2 shows a table of 'remainder' values corresponding to various digit values when appearing in various digit positions in an account identity number.

Referring now to the FIG. 1 a sales register (or an accounting machine terminal) in one department of a departmental store includes a keyboard 10 having keys for giving details of transactions to be debited to customers' accounts to a central data processing and accounting system. These keys include one set 11 for keying in the successive decimal digits of a customer's account identity number, the keys being labelled 0 to 9 respectively.

Associated with the keys 11 is an encoder 12 which provides a binary output signal appropriate to the key depressed, and a digit position index 13 which is indexed each time one of the keys 11 is depressed and which provides a binary output signal indicative of the number of digits that have been keyed in by depression of the keys 11 since the system was reset at the close of recording a previous transaction.

Thus, the binary output signal of the index 13 represents the position in a customer's account identity number of the digit just keyed in by depression of a key 11, and the binary output signal of the encoder represents the value of that digit.

The binary output signals of the encoder 12 and the digit position index 13 are supplied to separate input circuits 14 and 15 of a read-only store or memory 16, which has a binary output circuit 17 for providing a binary output signal representative of a "remainder" corresponding to the value and position in the account identity number of the digit just keyed in. The store in effect contains a look-up table of remainders corresponding to all of the digit positions and values. The table of remainders is shown in FIG. 2 and is based on a scheme of multiplying successive digit values by successive multipliers in the series 1 to 7 for successive digit position (that is positions relative to the extreme left-hand digit of the account number). Each remainder value is produced by multiplying the digit value by the multiplier appropriate to the digit position, and by taking the remainder after dividing the product by the modulus 11.

The table also includes two rows of "remainder" values corresponding to the eight digit position in the account number, but the significance of these values will be explained later.

The binary output signal of the read-only store 16 is supplied to one input circuit 18 of an adder 19 which is arranged to provide at an output circit 20 a binary output signal which represents the sum of the signal supplied at the input circuit 18 and a further binary input signal supplied at the second input circuit 21.

The binary output signal of the adder is supplied to one input circuit 22 of a "remainder accumulating" store 23, which is of the ring counter type and has 11 stages. This store has a second input circuit 24 to which is supplied the binary output signal of the digit position index 13, a first binary output circuit 25 which is connected to supply the output signal of the store as the input signal for the second input circuit 21 of the adder 19, and a second output circuit 26 connected to supply an alarm device 27.

This alarm device is arranged to illuminate a warning light 28 (or even sound a buzzer as well), when after all of the digits of a customer's account identity number have been keyed in, the store 23 contains a signal corresponding to a remainder greater than zero value.

A "digit sequence completed" key (not shown) on the keyboard is effective on depression, for example — by the operator, to reset the digit position index 13 and the remainder accumulating store 23 so that they register "zero" for both the digit position and the accumulated remainder.

The system operates in the following manner.

With the index 13 and the store 23 in their reset conditions the operator commences the keying in of the next transaction by keying in the successive decimal digits of the customer's account number.

On keying in the first digit, say of value 8, the digit position index 13 registers the first digit keyed, and supplies an output signal to the read-only store 16 so as to cause it to provide an output signal indicative of the remainder appropriate to the digit value 8 in the first digit position. According to FIG. 2 this remainder would be of value 8.

Thus the adder 19 has input signals representative of 8 and zero from the read-only store 16 and the remainder accumulating store 23 respectively.

The presence of the output signal of the digit position index 13 at the input circuit 24 of the remainder accumulating store 23 causes that store to reset and store the value eight + zero, i.e. eight.

On keying in the second digit, say of value 3, the digit position index 13 indexes to digit position 2 and provides an output accordingly to the stores 16 and 23. The store 16 thereupon provides an output signal corresponding to the digit value 3 in the second digit position, this output signal corresponding according to FIG. 2 to a remainder of 6.

Thereupon the adder produces an output corresponding to the sum of 8 (from the store 23) and 6 (from the store 16) to provide an output signal corresponding to 14. The presence at the input circuit 24 of the remainder accumulating store 23 of the signal from the digit poisition index 13 causes the store 23 to respond to the input signal representative of the value 14 from the adder output circuit 20. However, since the store 23 has only 11 stages, this store now registers the effective remainder of 14 minus 11, namely 3.

The keying in successively of the third to seventh digits of the account number will result in successive repetitions of the process just described, with a new remainder provided by the read-only store 16 being added each time to the cumulative remainder carried in the store 23, and this store over-flowing (or recycling) after each eleventh stage so as to register the new effective cumulative remainder.

In an accounting machine for which the cumulative remainder of the first seven digits has been used as the eight or check digit, the read-only store 16 includes the row 29 shown in FIG. 2, but nor normally the row 30.

Thus, on keying in the eight digit of the account identity number the read-only store 16 provides an output which is the complement of the cumulative remainder which should have appeared after correctly keying-in the first seven digits, so that if the account number has been properly keyed in the store 23 is caused to change to a state representative of zero cumulative remainder, thus proving that the account number has been properly keyed-in.

In this condition the warning device 27 provides no energisation for the lamp 28, which consequently remains unilluminated.

If on the other hand the cumulative remainder appearing in the store 23 after keying the seventh digit was incorrect, then on keying in the eight digit correctly the store 23 would not change to the zero remainder condition and the indicator lamp 28 would be illuminated.

Alternatively, if the accounting machine has been arranged to use as the eight or check digit, the complement of the correct cumulative remainder of the first seven digits, then the read-only store 16 includes the line 30 of table 2, but not normally the line 29. In this case on keying in the eight digit the actual digit value is provided as the output signal of the store 16 so as to cause the store 23 to change to the zero remainder condition in the event that the account identity number has been properly keyed in.

The apparatus may if desired be arranged to include both of the rows 29 and 30 of FIG. 2, but in that case a further key is provided so as to select the row 29 or 30 appropriate to the type of check digit used, namely a true or complement value digit.

With the apparatus described above the check digit does not have to appear at the end of the account number. It could just as well be included in any other predetermined digit position.

Any suitable form of read-only store 16 and remainder accumulating store 23 may be used.

The apparatus described above may also be used to create check digits for customers' account numbers, by keying-in the seven digits of such an account number, and then reading out the cumulative remainder held in the store 23. This remainder is the check digit for an account number to be used with a 'true' check digit, and the complement of this remainder is the check digit of an account number to be used with a 'complement' check digit.

The apparatus described above may also be made suitable for handling account numbers using different systems of check digit verification by providing, in the store 16, various look-up tables which are selectable at will be the operator, and by providing means for adjusting the number of stages to be used in the store 23 so as to suit the modulus of the look-up table selected by the operator.

The principles of the apparatus described above may be applied to other check digit verification means in which other suitable schemes of multipliers and modulii are used. For example, a modulus of ninety-seven in conjunction, if desired, with a scheme of multipliers as shown in the left hand column of FIG. 4 may be used. In such a case the account identity number includes, instead of a single decimal digit representing a check number value up to 9, a pair of adjacent decimal digits representing a check number of values up to 96.

If a series of account (or other identity) numbers are all associated with one particular branch of a large accounting organisation, this association can be indicated by adding to each account number a branch identity number. Thus, for example, a customer may be allotted an account identity number which includes at the beginning, said, three digits which identify the branch holding the customer's account. These three initial digits may be used to direct the various transactions to the respective branches for entry on the customers' respective accounts. In each branch, entry of the transactions of its own customers' transactions could be speeded up considerably if means could be provided whereby the branch identity digits once keyed in for the first transaction need not be keyed in for each successive transaction. The modified apparatus which will now be described with reference to the FIGS. 3 and 4 has such a facility.

The modified apparatus is intended to handle customers' account identity numbers having 12 decimal digits, of which the first three identify a particular branch of a large departmental store organisation, the next seven digits represent the customer's account number at that particular branch, and the last two represent a decimal check number in the range zero to 96 appropriate to the preceding 10 digits.

Figure 3:
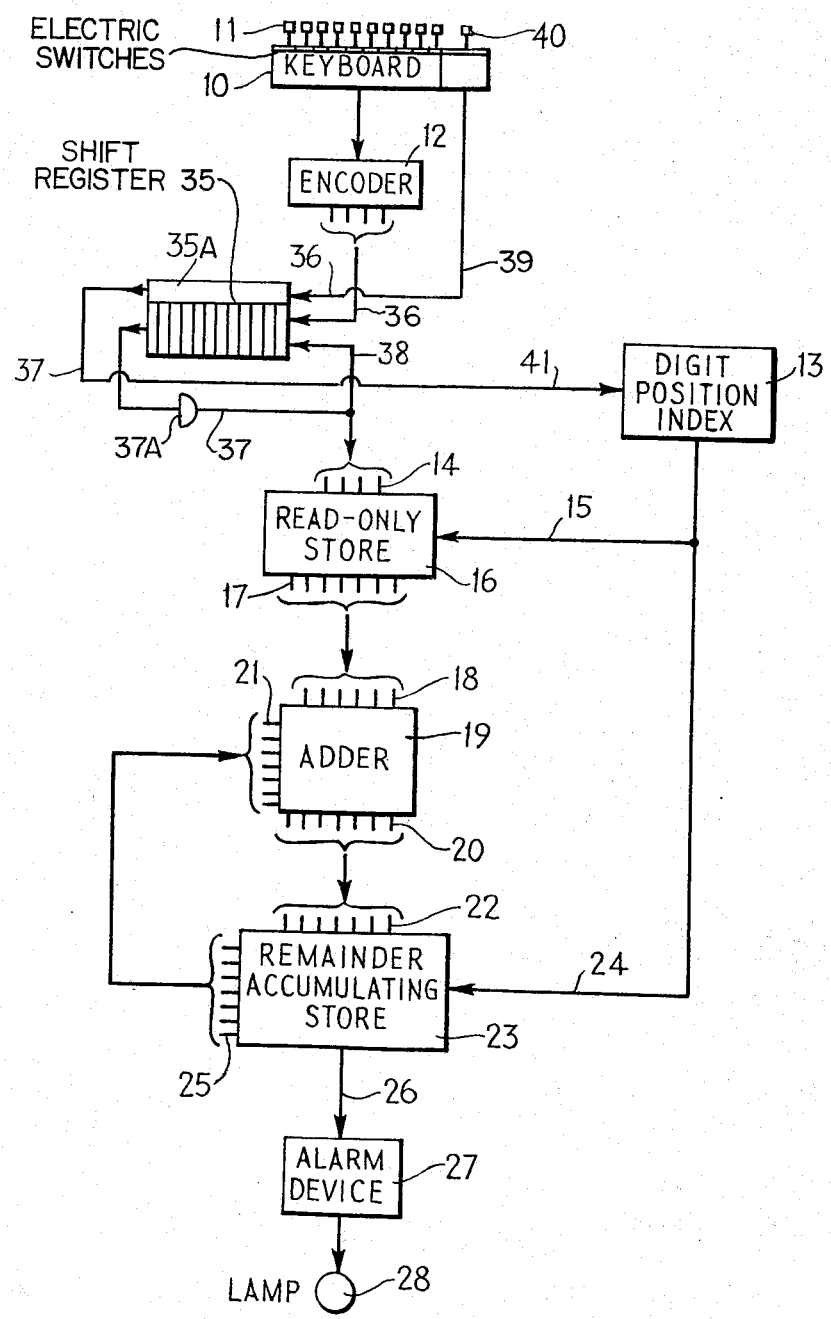
FIG. 3 shows a schematic block diagram, generally similar to that of FIG. 1, showing the electric circuit connections of the modified form of apparatus.

The modified apparatus of FIG. 3 is generally similar to the apparatus of FIG. 1, but differs therefrom in the following respects. Each part which is common to both apparatuses has the same reference in the respective figures.

The modified apparatus is intended to operate with a system of check numbers devised by the use of a modulus of 97. The table of remainder values shown in FIG. 4 has values ranging from zero to 96, so that the read-only store 16 has a seven bit (binary-digit) output circuit 17. Likewise, the adder 19 and remainder accumulating store 23 have seven bit circuitry, and this store 23 has 97 stages.

Unlike the apparatus of FIG. 1, the encoder 12 of the modified apparatus supplied its 4 bit output signals to the input circuit 14 of the store 16 via a shift register 35. This register has a first input circuit 36 which receives the output signals of the encoder 12, an output circuit 37, controlled by an output gate 37A, which supplies output signals from the register in serial manner to the input circuit 14 of the store 16, and a second input circuit 38 connected to receive the output signals delivered to the output circuit 37.

The shift register has an input control circuit 39 for receiving a control signal from a control key 40 mounted on the keyboard 10, and an output control circuit 41 for supplying indexing signals to the digit position index 13.

The apparatus operates in the following manner. The operator after completion of one transaction depresses a "digit sequence completed" key (not shown) to reset to zero state the digit position index 13 and the remainder accumulating store 23. He thereupon keys in, digit by digit, the next customer's account identity number.

Each time a digit key 11 is depressed the encoder 12 supplies a binary digital signal indicative of the decimal value of the digit to the shift register input circuit 36. This signal is stored in the input stage, stage one, of the shift register, and other signals already stored in the stages two to nine of the register are all, in effect, moved along one stage in the direction of the output stage, stage twelve, of the register. Control apparatus 35A of the shift registers however prevents any change in the digits stored in the stage ten, eleven, and twelve respectively until the tenth, eleventh and twelfth account number digits (if any) are keyed in, whereupon these three stages take up the first, second and third account number digits transferred to them via stage nine of the register.

Keying-in of digits continues until all twelve account number digits are stored in the respective stages of the shift register. When the operator depresses the control key 40 to signify to the control apparatus of the shift register that the digit sequence is complete, the aforesaid output gate 37A opens so as to let output signals to be produced by the shift register to be delivered to the output circuit 37. The control apparatus 35A then pulses the shift circuit of the register 12 times whereby to cause the 12 account number digits stored in the register stages to be delivered (in binary form) serially to the output circuit 37, and hence to the input circuit 14 of the read-only store 16.

The control apparatus 35A also delivered the shift pulses via output control circuit 41 to the digit position index 13 whereby to cause the latter to deliver to the input circuit 15 of the store 16 binary signals indicative of the respective positions in the keyed-in account identity number of the digits whose values are delivered in succession by the shift register output circuit 37 to the input curcuit 14 of that store 16.

Thus the read-only store 16 receives simultaneously at its input circuits signals indicative of the value and position of each account number digit in turn. This store thereupon functions to provide at its output circuit 17 a 'remainder' value appropriate to the value and position of each account number digit in turn, in accordance with the values indicated in the table of FIG. 4.

The adder 19, the remainder accumulating store 23, and the alarm device 27 and lamp 28 function in response to the successive output signals of the store 16 in a manner similar to that already described with reference to the FIG. 1, to provide illumination and warning of an error in an account number just keyed-in only when the remainder accumulating store 23 does not reach the state representative of zero cumulative error at the end of the sequence of digit values and positions.

The table of FIG. 4 shows at the eleventh and twelfth digit positions the 'remainder' values appropriate to a check digit verification system in which the two check number digits (the eleventh and twelfth digits) represent the respective complements (relative to modulus 97) of the respective digit values.

The control apparatus 35A of the shift register 35 is arranged so that as the contents of the shift register stages are being fed via output circuit 37 to the store 16, they are also fed via input circuit 38 to the first stage of the shift register for advancement again through the successive stages of the register. However, the control apparatus operates to admit only the first three output digits of the account number to the input stage, so that these three digits are advanced through the register to the stages twelve, eleven and ten respectively, and are held there, the other stages nine to one all being reset to the zero condition in readiness for the keying in of the next account identity number.

After the 12 digits of the account identity number just keyed in have been shown to be correct, and the details of the associated account transaction have been keyed into an associated data processing system, the aforesaid "sequence completed" key is depressed, and this causes the digit position index 13 and the remainder accumulating store 23 to be reset to their zero states.

When the next account identity number to be keyed in has the same first three digits as the last account identity number (signifying that these two accounts are associated with the same accounting branch) it is necessary to key in only the last nine digits of this second account identity number.

In keying in these nine digits they are advanced progressively through the stages one to nine of the shift register, so that after the last account number digit has been keyed in, the successive shift register stages store the successive 12 digits of this second account number. Depression of the control key 40 then causes the serial presentation of all 12 digits to the read-only store input circuit 14 and the digit position index 13. Verification of the account number then proceeds as described before. Again the first three digits presented to the store input circuit 14 are also returned to the input stage of the shift register, so that they eventually become restored in the stages twelve, eleven and ten of the shift register.

This process of keying-in the last nine digits of this particular second account identity number can be shortened still further since it is in fact unnecessary, when the first three digits are the same as those of the preceding account identity number, to key in zeros which follow the first three digits and precede the first significant digit appearing in the last nine digits. This results from the fact that when the shift register is delivering its contents to the input circuit 14 of the read-only store 16, the first three digits are entered back into the twelfth, eleventh and tenth register stages, and all the other stages are reset to the zero state. Thus on keying in the first significant digit in the last nine digits and the digits that follow it, these advance automatically to the appropriate stages of the shift register, thus leaving the stages nine, eight, seven, etc. which precede the stage having the said first significant digit set at their zero states.

For example, the first account at the branch having the identity 210 has an identity number 210 000 0001 53, the second account at that branch has the identity number 210 000 0002 54, and the third account has the identity number 210 000 0003 55, the digit pairs 53, 54 and 55 being the respective check numbers.

When keying in transactions on these accounts, the full account identity number (12 digits) of the first account is keyed in if the preceding transaction has concerned an account at a different branch.

However, when keying-in the second and third transactions only the last three digits 254 and 355 need by keyed in. Despite this, on each occasion the shift register when stimulated by the depression of the control key 40, to signify the end of the keying-in process, delivers the full twelve digits representing the account identity number.

The check digit verification systems described above can be readily applied to existing keyboard machines (such as "ADD-LIST" machines and teleprinters) by the insertion beneath the key heads of each such machine of an array of pressure-sensitive electric switches for delivering pulses to appropriate circuits of the encoder 12. Thus on depression of a key, the key head descends momentarily on to the associated pressure-sensitive electric switch and causes an electric pulse to be sent to the encoder 12. The said array of electric switches may be foremed as a flexible mat of insulating materials in which are sandwiched metal foil pads constituting the poles of the switches, the mat having apertures to enable it to be placed over the respective key stalks after temporary removal of the key heads. Thus on replacement of the key heads, depression of a key head results in the pressing together of the associated, normally-separated, metal foil pads of the associated key switch.

The alarm device may be arranged to provide an inhibit signal when an incorrectly keyed account indentity number has been detected, which inhibit signal inhibits operation of an associated data processing machine to prevent entry and/or printing of the incorrectly keyed account identity number on a record.

In applying the above described systems to an ADD-LIST machine the "sequence-completed" signal may be derived from a limit switch operated by the movable printing carriage of the machine. In such a machine the check digit verification system is arranged to operate only in respect of the account identity numbers, and not in respect of the account transactions to be recorded against the account identity numbers.

The apparatus described incorporates inter alia the use of the following concepts in check digit verification generation apparatus:

a. the use of a read-only store (16) to hold tables of remainders whereby to obviate the need for a computing ability;

b. the use of remainders appropriate to the respective digits of an identity number, and summing the remainders to provide the overall remainder;

c. the use of a remainder accumulating store (23) having a number of stages equal to the modulus of the system, so that the contents of the store is the remainder, thus obviating the need for a 'division' computing ability; and d. the use of a shift register for temporarily storing the digits of an identity number which is to be verified, and for retaining a predetermined number of the initial digits after all of the digits have been transferred into the verification means, whereby to reduce the number of digits that have to be keyed-in when the next identity number for verification includes the retained group of digits.

Apparatus as described above may be used for check digit verification of identity numbers used for purposes other than accounting and sales analysis.

I claim:

1. A keyboard apparatus for generating check digits for use with sequences of decimal digits, including a. a plurality of manually-operable keys of which at least ten (referred to hereafter as decimal digit keys) represent the 10 respective decimal digits, b. a plurality of electric switching means associated with the respective decimal digit keys and operative to change from a first to a second switching state on operation of the associated decimal digit key, c. electric encoding means having input circuit means connected with the respective switching means, and output circuit means at which are delivered electric "digit value" signals representative of the particular electric switching means then in said switching state, d. electric indexing means having input circuit means connected with each of said electric switching means and being responsive to the changing of any one of said switching means to said second switching state, and electric output circuit means at which are delivered electric "digit position" signals representative of the position in a sequence of decimal digits being keyed in, by sequential operation of the appropriate decimal digit keys, of the decimal digit last keyed in, e. "remainder value" signal producing means having first input circuit means connected to receive signals from said output circuit means of said encoding means, second input circuit means connected to receive signals from said output circuit means of said indexing means, and output circuit means at which is delivered in response to corresponding digit value and digit position signals delivered to said first and second input circuit means an electric "remainder value" signal representative of a predetermined remainder value corresponding to the digit value and digit position of a decimal digit just keyed in by operation of a selected decimal digit key.

f. an electric "accumulated remainder value" signal storage means having an input circuit means, first and second output circuit means, and a reset circuit means connected to receive 'reset' signals from said output circuit means of said indexing means, g. an electric adding means having a first input circuit means connected to receive signals from said output circuit means of said signal producing means, a second input circuit means connected to receive signals from said first output circuit means of said signal storage means, and an output circuit means connected to deliver "sum" signals to said input circuit means of said signal storage means, which "sum" signals represent the sum of the signals received at said first and second input circuit means, and h. an output device connected to receive signals from said second output circuit means of said signal storage means, and having output circuit means at which are delivered, after the sequence of decimal digits has been keyed in, check digit signals representative of the deviation of the signal then stored in said signal storage means from the nearest multiple of a predetermined modulus number.

each of said predetermined reminder value being the excess, over the nearest multiple of the modulus number, of the associated decimal digit value when multiplied by a predetermined multiplier dependent on the position in said sequence of the particular decimal digit.

2. Keyboard apparatus according to claim 1, wherein said "remainder value" signal producing means comprises an electric storage means for holding at separate storage addresses predetermined "remainder value" signals for each of the respective digit values that may appear in the respective digit positions in a said sequence, and wherein said storage addresses deliver to said output circuit means of said signal producing means said "remainder value" signals when addressed by corresponding "digit value" and "digit postion" signals delivered to said first and second input circuit means of said signal producing means.

3. Keyboard apparatus according to claim 2, wherein said electric storage means comprises a read-only storage means.

4. Keyboard apparatus according to claim 1, wherein said signal storage means has a signal storage capacity equal to said predetermined modulus number, so that only the excess of a said "sum" signal over the predetermined modulus number is stored in said signal storage means.

5. Keyboard apparatus according to claim 4, wherein said signal storage means comprises a ring counter having a number of stages equal to the said predetermined modulus number.

6. Keyboard apparatus according to claim 1 wherein the digit value of a check digit appearing in a check digit position is the excess over the nearest multiple of the modulus number of the accumulated remainder value of all the other digits in a said sequence, and wherein said remainder value signal produced by said signal producing means in respect of said check digit value is the complement of said excess.

7. Keyboard apparatus according to claim 6 including a two state changeover means associated with said signal producing means for enabling said signal producing means to produce in relation to a check digit value "remainder value" signal representative alternatively of said excess of the accumulated remainder value of the other digits in a said sequence, or the complement of said excess the changeover means being adjustable to one operating state or the other so as to enable the keyboard apparatus to handle digit sequences with 'complement' check digits or 'true' check digits respectively as desired.

8. Keyboard apparatus according to claim 1 wherein digit values of check digits appearing in a plurality of check digit positions sum to produce a decimal value equal to the excess over the nearest multiple of the modulus number of the accumulated remainder value of all the other digits in a said sequence, and wherein said remainder value signals produced by said signal producing means in respect of said check digits sum to produce the complement of said excess.

9. Keyboard apparatus according to claim 1 for verifying decimal digit sequences which include check digits, wherein the output device has alternatively an output circuit means at which are delivered, after the sequence of decimal digits has been keyed in, two-state electric 'verification' signals of which the respective states are indicative of the correspondence, and lack of correspondence respectively between the signal then stored in said signal storage means and said nearest multiple of the predetermined modulus number, and wherein said signal producing means delivers at its output circuit means in respect of a check decimal digit appearing in a check digit position in each said sequence a "remainder value" signal representative of a decimal value which will for correct keyin-in of the digit sequence produce a state of correspondence between said then-stored signal and said nearest multiple of the predetermined modulus number.

10. Keyboard apparatus according to claim 9, wherein said "remainder value" signal producing means comprises an electric storage means for holding at separate storage addresses predetermined "remainder value" signals for each of the respective digit values that may appear in the respective digit positions in a said sequence, and wherein said storage addresses deliver to said output circuit means of said signal producing means said "remainder value" signals when addressed by corresponding "digit value" and "digit position" signals delivered to said first and second input circuit means of said signal producing means.

11. Keyboard apparatus according to claim 10, wherein said electric storage means comprises a read-only storage means.

12. Keyboard apparatus according to claim 9, including electrically-controlled inhibiting means for inhibiting other actions of the keyboard apparatus which are to be performed subsequently to the correct keying-in of a said sequence of decimal digits on the decimal digit keys, and means for supplying said verification signals to said inhibiting means whereby to inhibit said other actions whenever the state of a verification signal is indicative of said lack of correspondence between said then-stored signal and said nearest multiple of the modulus number.

13. Keyboard apparatus according to claim 12, wherein said inhibiting means includes warning means for warning an operator of the keyboard apparatus whenever a subsequent action is inhibited due to an incorrect keying-in of a said decimal digit sequence.

14. Keyboard apparatus according to claim 9, wherein said signal storage means has a signal storage capacity equal to said predetermined modulus number, so that only the excess of a said "sum" signal over the predetermined modulus number is stored in said signal storage means.

15. Keyboard apparatus according to claim 14, wherein said signal storage means comprises a ring counter having a number of stages equal to the said predetermined modulus number.

16. Keyboard apparatus according to claim 9, wherein the digit value of a check digit appearing in a check digit position is the excess over the nearest multiple of the modulus number of the accumulated remainder value of all the other digits in a said sequence, and wherein said remainder value signal produced by said signal producing means in respect of said check digit value is the complement of said excess.

17. Keyboard apparatus according to claim 16, including a two state changeover means associated with said signal producing means for enabling said signal producing means to produce in relation to a check digit value a "remainder value" signal representative alternatively of the said excess of the accumulated remainder value of the other digits in a said sequence, or the complement of said excess, the changeover means being adjustable to one operating state or the other so as to enable the keyboard apparatus to handle digit sequences with 'complement' check digits or 'true' check digits respectively as desired.

18. Keyboard apparatus according to claim 9, wherein digit values of check digits appearing in a plurality of check digit positions sum to produce a decimal value equal to the excess over the nearest multiple of the modulus number of the accumulated remainder value of all the other digits in a said sequence, and wherein said remainder value signals produced by said signal producing means in respect of said check digits sum to produce the complement of said excess.

19. A keyboard apparatus for generating check digits for use with sequences of decimal digits, including a. a plurality of manually-operable keys of which at least 10 (referred to hereafter as decimal digit keys) represent the 10 respective decimal digits, b. a plurality of electric switching means associated with the respective decimal digit keys and operative to change from a first to a second switching state on operation of the associated decimal digit key, c. electric encoding means having input circuit means connected with the respective switching means, and output circuit means at which are delivered electric "digit value" signals representative of the particular electric switching means then in said second switching state, d. temporary storage means having input circuit means connected with said output circuit means of said encoding means for receiving therefrom said digit value signals, a plurality of separate storage addresses at which successive digit value signals received from the encoding means during the keying-in of a sequence of decimal digits on said decimal digit keys may be stored temporarily until all of the digits of the sequence have been keyed in, output signal control means, a first output circuit means at which in response to the delivery to said control means of a "sequence complete" control signal are delivered the respective digit value signals then stored in the successive storage addresses, in the sequence in which they had previously been stored in those addresses, and a second output circuit means at which an indexing signal is delivered each time a said digit value signal is delivered to said first output circuit means, e. control signal generating means connected to said output signal control means and operable on completion of the keying-in of a said sequence of decimal digits whereby to supply a said "sequence complete" control signal to said output signal control means f. electric indexing means having input circuit means connected with said second output circuit means of said temporary storage means whereby to receive said indexing signals, and electric output circuit means at which are delivered electric "digit position" signals representative of the respective positions, in a sequence of decimal value signals then being delivered at said first output circuit of said temporary storage means, of the successive digit value signals, g. "remainder value" signal producing means having first input circuit means connected to receive said digit value signals from said first output circuit means of said temporary storage means, second input circuit means connected to receive said digit position signals from said output circuit means of said indexing means, and output circuit means at which is delivered in response to corresponding digit value and digit position signals delivered to said first and second input circuit means an electric "remainder value" signal representative of a predetermined remainder value corresponding to the digit value and digit position of a decimal digit which is represented by said corresponding digit value and digit position signals, h. an electric "accumulated remainder value" signal storage means having an input circuit means, first and second output circuit means, and a reset circuit means connected to receive 'reset' signals from said output circuit means of said indexing means, i. an electric adding means having a first input circuit means connected to receive signals from said output circuit means of said signal producing means, a second input circuit means connected to receive signals from said first output circuit means of said signal storage means, and an output circuit means connected to deliver "sum" signals to said input circuit means of said signal storage means, which "sum" signals represent the sum of the signals received at said first and second input circuit means, and j. an output device connected to receive signals from said second output circuit means of said signal storage means, and having output circuit means at which are delivered, after operation of said control signal generating means whereby to provide a "sequence complete" signal, check digit signals representative of the deviation of the signal then stored in said signal storage means from the nearest multiple of a predetermined modulus number, each said predetermined remainder value being the excess, over the nearest multiple of the modulus number, of the associated decimal digit value when multiplied by a predetermined multiplier dependent on the position in said sequence of the particular decimal digit.

20. Keyboard apparatus according to claim 19 for verifying decimal digit sequences which include check digits, wherein the output device has alternatively an output circuit means at which are delivered, after operation of said control signal generating means whereby to provide a "sequence complete" signal, two-state electric 'verification' signals of which the respective states are indicative of the correspondence, and lack of correspondence respectively between the signal then stored in said signal storage means and said nearest multiple of the predetermined modulus number, and wherein said remainder value signal producing means delivers at its output circuit means in respect of a check decimal digit appearing in a check digit position in each said sequence a "remainder value" signal representative of a decimal value which will for correct keying-in of the digit sequence produce a state of correspondence between said then-stored signal and said nearest multiple of the predetermined modulus number.

21. Keyboard apparatus according to claim 20, wherein said output signal control means of said temporary storage means includes means enabling said temporary storage means to retain, for future use when handling a next sequence of digit value signals, replicas of at least a predetermined initial group of the digit value signals just delivered via said first output circuit means to said remainder value signal producing means.

* * * * *